United States Patent Office 3,524,620
Patented Aug. 18, 1970

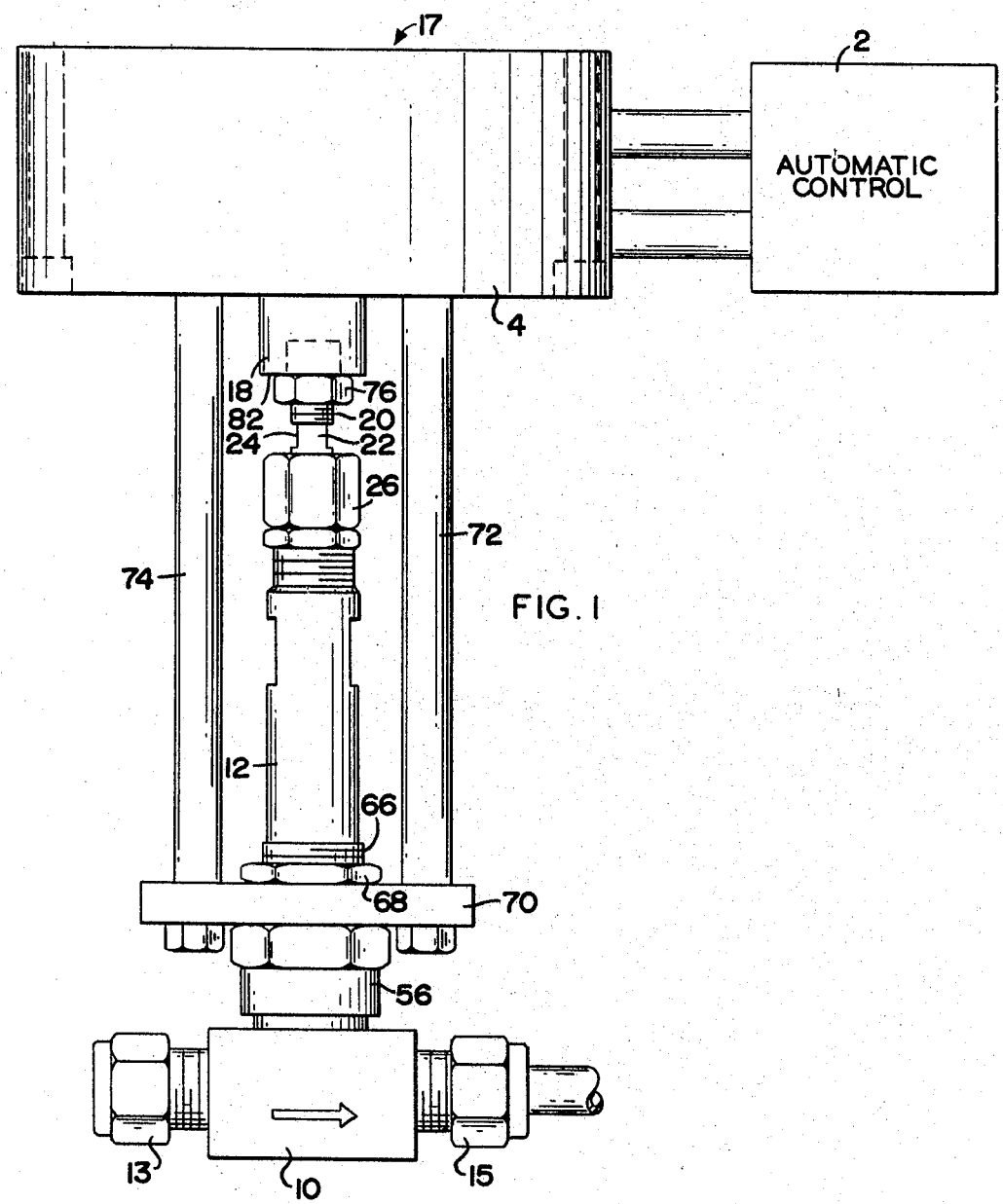

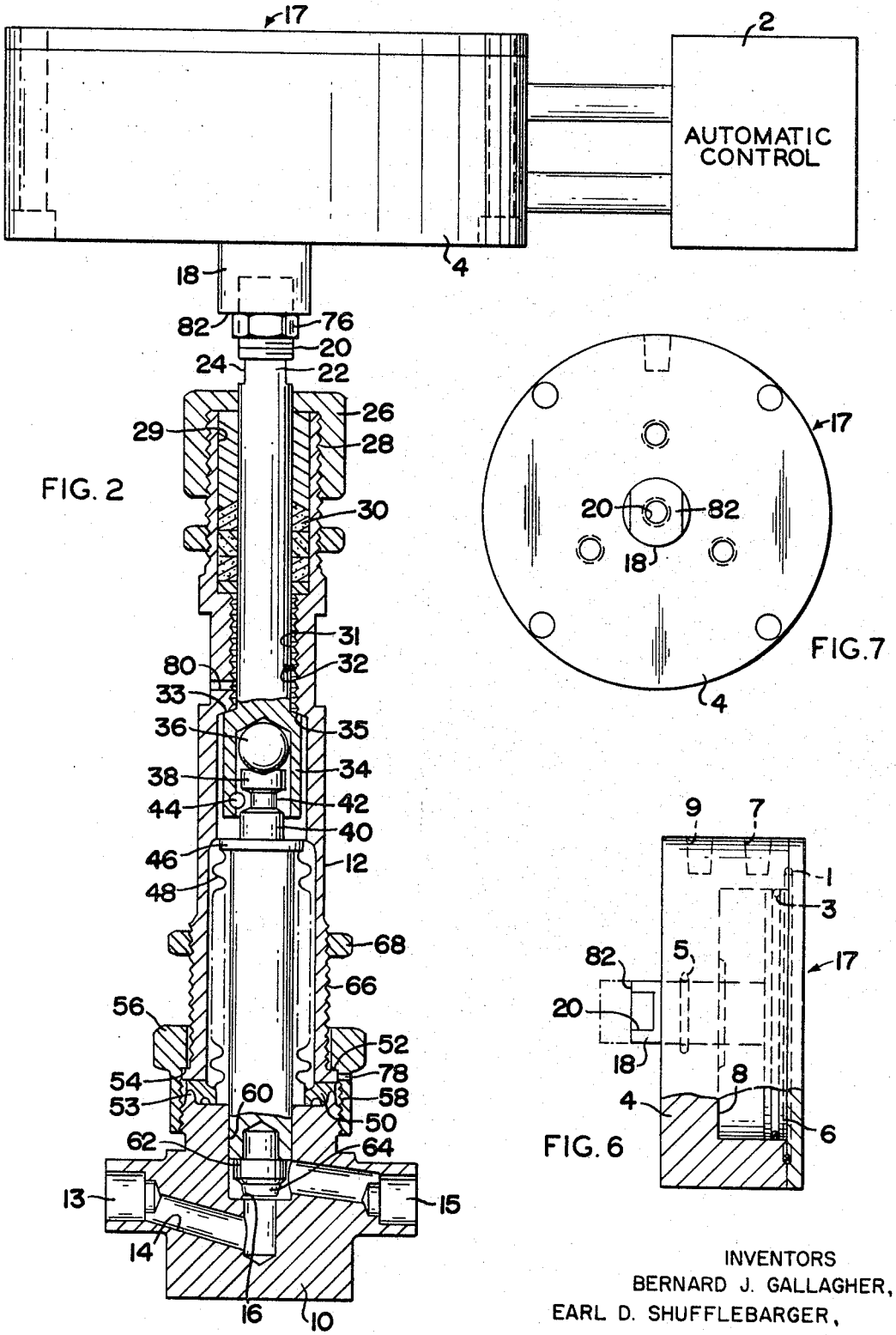

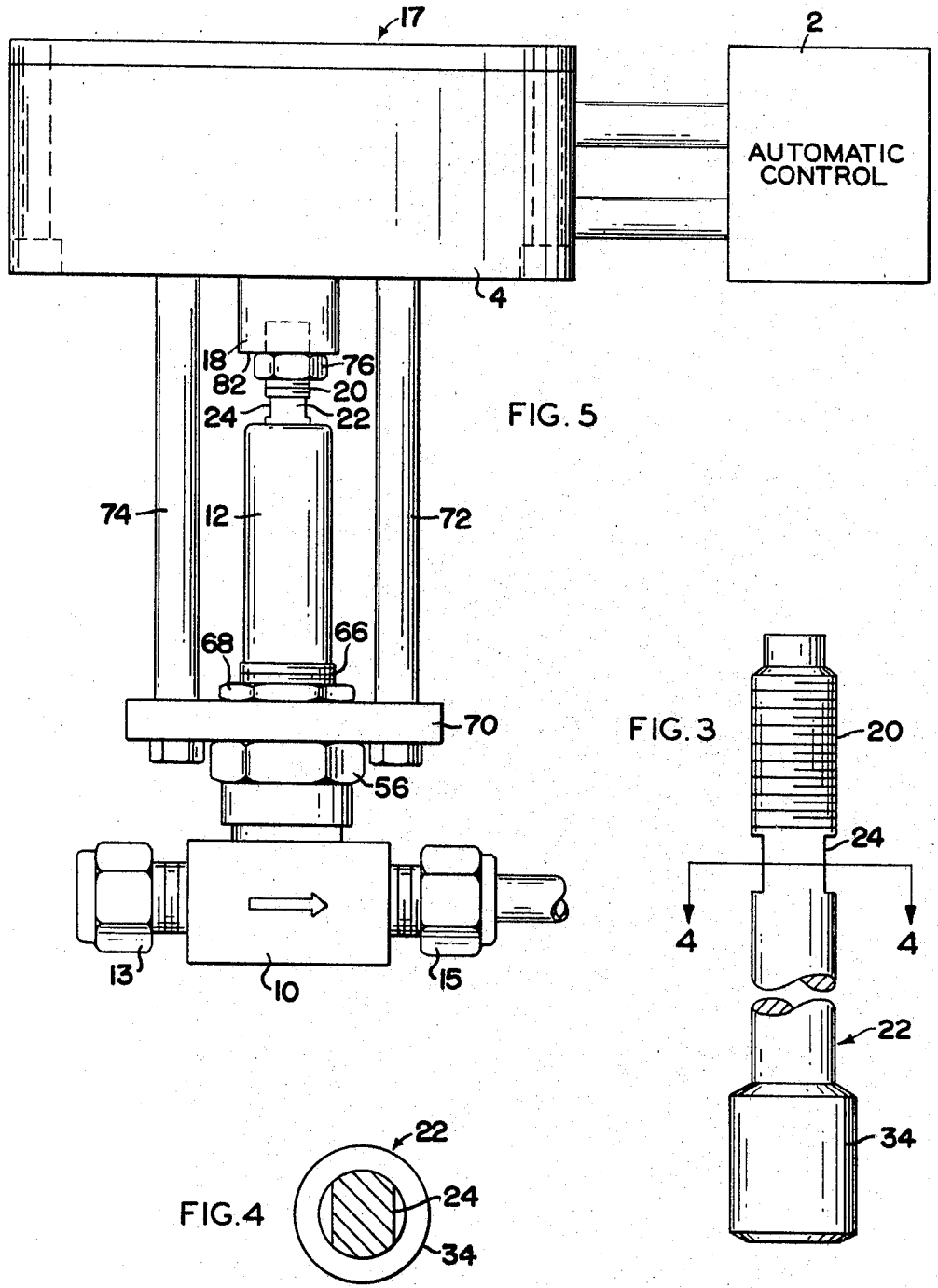

3,524,620
AUTOMATICALLY CONTROLLED BELLOWS VALVE
Bernard J. Gallagher and Earl D. Shufflebarger, Mentor, and John R. Boylan, Cleveland Heights, Ohio, assignors to Nupro Company, Cleveland, Ohio, a corporation of Ohio
Filed May 27, 1968, Ser. No. 732,120
Int. Cl. F16k 31/363
U.S. Cl. 251—63.4         11 Claims

ABSTRACT OF THE DISCLOSURE

This invention involves the combination of a bellows valve and control means for regulating the valve between open and closed positions. The basic structure includes a valve body having an inlet, an outlet and a valve seat disposed in the passageway therebetween. A bonnet is attached to the valve body coaxial with a valve stem opening. A valve stem projects through the opening, the stem being two coaxially aligned sections. The two sections are attached by a pin-in-groove or other type of connection which allows relative rotational movement of the two stem sections. This permits the second or lower stem section to remain fixed against rotation relative to the bonnet. A bellows is disposed within the bonnet around the stem and is attached in fluid tight relationship to the lower stem section and to the valve body to serve as a fluid seal against fluids passing through the valve body. The lower end of the lower stem section defines a structure for sealing against the valve seat. The upper stem section projects above the bonnet and is guided and held coaxial therewith by packing disposed in the upper end of the bonnet. Projecting beyond the upper end of the bonnet the upper stem section threadedly engages a rod which is rigidly attached to a piston in a piston-cylinder combination. The upper stem section is rotatable relative to the rod and the second stem section, whereby rotation in one direction will lengthen the rod-first stem section-second stem section combination and rotation in the other direction will shorten that combination.

BACKGROUND OF THE INVENTION

The combination of automatic controls and valves is not new and bellows valves per se are not new. An example of the prior art in bellows valves is Pat. No. 3,278,156.

This invention is concerned with the adaptation of the bellows valve of that patent to an automatic control system. Automatic control systems for pipe lines have been of increasing importance in recent years as more and more automatically controlled manufacturing plants have become economically feasible.

One problem encountered was the threaded stem of the bellows valve of Pat. No. 3,178,156. The threaded connection proved impractical from a time of response standpoint. The time required from actuation to completed response is prohibitive. It is important in fluid systems, as in other systems which involve automatic controls, to have quick response to the controls. Rotation of the stem to close the valve is slow and it was conceived that a reciprocating piston action would be more efficient.

Therefore, the necessity arose to eliminate the stem thread connection between the stem and the bonnet. Also, as there is to be no thread connection between the stem, it is desirable on some models to have a bracing or guiding means which centers the stem in the bonnet. This guiding means is a packing placed around the stem in the bore of the bonnet and serves two functions, (1) a guide for the reciprocating stem and (2) a safety seal for the valve.

The need to have a means for adjusting the length of the stem and rod combination, that is the distance between the actuating means and the valve seat in the valve body, becomes evident after the stem threads are eliminated. The reciprocating stroke of the stem must completely close the valve on one extreme and completely open the valve on the other extreme. The need for adjustability is fulfilled by the innovations of (1) placing the rod of the automatic control and the stem section in threaded engagement with machine threads and (2) providing tool pads or wrench flats on the stem. By these mechanisms the stem may be rotated and thereby the length adjusted.

BRIEF DESCRIPTION OF THE INVENTION

This invention involves a bellows valve and a control mechanism or actuator for regulating fluid flow through the valve. The valve includes a valve body, an inlet and an outlet in said body, and a fluid passageway therebetween. Disposed within the passageway is a valve seat. A bonnet is attached to the body around an opening into said passageway. The lower end of a stem projects through the bonnet and the opening into the valve body. The lowermost portion of the stem is constructed to sealingly engage the valve seat.

Optionally, there may be disposed around the stem, within the outer end of the bonnet, a packing means. The packing serves both as a brace or guide to center the stem and as a seal to prevent leakage of fluids. Intermediate the lower sealing portion of the stem and the packing is a bellows which surrounds the stem. The bellows acts as a fluid seal and as such is attached in fluid tight relationship to the body and to the stem.

The stem is in two sections, an upper and a lower portion. The connection between the two stem sections is constructed to allow relative rotation of the two sections. The lower portion remains relatively stationary whereby no torque is placed on the bellows. The upper end of the upper stem section is threaded by machine threads to a rod. The rod in turn is attached to an actuator. The actuator reciprocates the rod in an up and down direction whereby the stem is moved up and down to open and close the valve. Disposed on the upper stem portion are tool pads or wrench flats for engagement by a workman's tool to rotate the upper portion of the stem. The rod remains stationary when the upper stem portion rotates, whereby rotation of the upper portion of the stem will shorten or lengthen the rod-stem combination as the stem moves up or down on the machine threads.

It is an object of this invention to adapt a bellows valve to an automatic control system.

It is another object of this invention to provide a means for guiding and supporting a stem of a bellows valve.

It is another object of this invention to provide a means for adjusting the length of the extension of a stem into a valve body.

Another object of this invention is to provide an automatically controlled bellows valve with means for adjusting the length of the stem extension into the valve body.

Another object of this invention is to provide an automatically controlled bellows valve including means to guide and support the valve stem and means to adjust the extension of the stem into the valve body.

BRIEF DESCRIPTION OF THE DRAWINGS

FIG. 1 is a diagrammatic view of an automatic control-valve combination;

FIG. 2 is an elevational view of the FIG. 1 combination partially in section;

FIG. 3 is an elevational view of the upper section of the stem;

FIG. 4 is an end view of the upper section of the stem, in section, broken along line 4—4 of FIG. 3;

FIG. 5 is a diagrammatic view of the combination of FIG. 1 with a modified bonnet;

FIG. 6 is an elevational view, partially in section, of the actuating mechanism; and FIG. 7 is a bottom view of the actuating mechanism.

PREFERRED EMBODIMENT

This invention involves the combination of a bellows valve with automatic control means as illustrated best in FIGS. 1 and 2. Briefly described, the valve includes a valve body 10 attached to a bonnet 12. Passing through the body 10 is a fluid passageway 14 between the inlet 13 and the outlet 15 and located in the passageway is a valve seat 16. Controlling the operation of the valve is a control 2. The control 2 may be any particular type of automatic control device which is suitable in this combination.

As seen in FIG. 6, an actuator 17 includes a housing 4 containing a piston 6 disposed within a cylinder 8. Air passages 7 and 9 are shown for conducting air to the cylinder 8 from the control mechanism 2. O-ring seals 1, 3 and 5 are shown at various spots in the actuator mechanism 17 for sealing purposes. The cylinder-piston actuating device as illustrated in the drawing is intended to be merely representative and obviously is not the only mechanism for actuating the rod 18. The rod 18 may be actuated by any number of different styles of actuating mechanisms. For example, a magnetic rather than air pressure operated piston might be used or the air could be employed with a flexible diaphragm to reciprocate the rod 18.

The rod 18 and the first stem section 22 are connected by interengaging threads 20. The threads 20 are machine type threads as opposed to pipe type threads. That is, the threads have the same diameter throughout rather than tapering as in pipe threads. The first stem section has wrench flats or tool pads 24 intermediate the threads 20 and the bonnet 12. In this type of valve it is necessary that the length of the stem-rod combination be adjustable so the outermost extension of the stem extends far enough to seal against, but not far enough to injure, the valve seat 16. Therefore, the tool pads 24 are provided for rotating the first stem section 22 relative to rod 18. In this manner the length of the rod-stem combination may be lengthened or shortened as desired.

A packing nut 26 is threaded to the bonnet 12 by interengaging threads 28. Disposed around stem 22, in a bonnet recess 29 at the top of the bonnet 12, is packing means 30. The packing nut 26 is adapted to compress the packing 30 in recess 29 and around the first stem section 22. The packing serves two functions, one as a seal and one as a bracing or guiding means which will be further explained subsequently.

The packing 30 is, of course, optional. The intent is to adapt existing bellows valves for automatic control systems with a minimum of replacement parts. The result is the replacement of only one part. The upper stem section 22, illustrated in FIGS. 6 and 7, replaces the upper stem section of hand operated bellows valves. The bonnet 12 used in the automatically controlled valves is the same one that came with the hand operated bellows valve; it even retains the internal threads 31 for engaging the threaded upper stem section of the hand operated valve. The threads 31 closely surround stem 22 and serve to guide the stem to some extent. The threads 31 should be lubricated to allow easy reciprocation of the stem. Some of the bonnets in current use do not have a packing nut 26 nor any packing 30 around the stem 22 as illustrated by Pat. No. 3,278,156. In such a structure the automatic control system functions without any packing 31 as shown in FIG. 5.

The first stem section 22 extends into the bonnet 12 through bore 32. At its lower end the first stem section 22 defines a socket 34 which houses a ball 36 and a flange like extension 38 on the upper end of the second or lower stem section 40. A pin 44 extends through an opening in the socket wall and projects into the annular groove 42 around the upper end of the second stem section 40, thereby preventing disengagement of the two stem sections. The ball 36 serves to limit friction between the two stem sections whereby the torque transmitted from one section to the other is minimized. The need to limit transmission of torque to the second stem section 40 will be explained subsequently.

A flange 46 extends radially outward from the second stem section 40 at a position below the groove 42. A bellows 48 is welded, brazed or otherwise adhered to flange 46 in fluid tight engagement. The bellows 48 closely surrounds the middle portion of the second stem section 40 to allow movement of the stem section in a reciprocating, up and down, fashion and serves as a seal in the valve. Corrosive fluids flowing through the valve will have access to the second stem section 40 and the radially inner surface of bellows 48. A ring 50 is attached to the lower end of the bellows and the ring 50 is sealingly clamped between a flange 52 on the bonnet and a ridge 53 on the valve body. The bellows is welded or otherwise adhered to the ring 50 in fluid tight engagement. The flange 52 is held against the ring 50 by a shoulder 54 on the bonnet nut 56. Interfitting threads 58 serve to attach the bonnet nut 56 and the valve body 10.

The lower end of the second stem section 40 extends into a bore 60 in the valve body 10. The second stem section 40 is of a size substantially equal to the size of bore 60 although adequate clearance is provided to allow fluid passage between the walls of bore 60 and the second stem section 40 and stem head 62. However, a close dimensional relationship is necessary in this area. The bellows 40 is not adequate to provide a guiding means for the second stem section 40 and it is extremely important that the stem head 62 and stem seat 64 remain closely aligned with the valve seat 16. Any misalignment could cause a malfunction of the valve and a leak in the system.

A back seat is provided in the bonnet 12 to act as a fluid seal against gross leakage should the bellows rupture. Occasionally the bellows will leak when it is inconvenient to shut down the fluid operation to make repairs. To remedy this problem, cooperating sealing surfaces are formed on the shoulder 33 of the second stem section 40 and the ridge 35 adjacent bore 32 within the bonnet 12. When the valve is open the shoulder 33 engages the ridge 35 and, as a temporary measure, prevents or greatly reduces any loss of corrosive or expensive fluids.

Disposed on the exterior of the bonnet 12 are mounting threads 66 which hold mounting nut 68. The mounting nut 68 is adapted to clamp a panel or wall against the head of bonnet nut 56 to hold the valve rigidly in place. Similarly, the nut 68 is adapted to rigidly hold in place an outwardly extending flange 70 which serves as a rigid attaching means for bolts 72 and 74 which precisely locate the actuating housing 4 relative to the valve seat 16. Bolts 72 and 74 thread into apertures in housing 4. FIG. 7 shows three apertures 71, 73 and 75 for receiving three such threaded bolts. Once the valve body 10 and actuator 4 are assembled in operating relationship, the tool pads 24 may be engaged by a wrench or tool and rotated to properly seat the stem seat 64 on valve seat 16. When such a fine adjustment is made, a nut 76 on stem threads 20 is tightened against face 82 of rod 18 to lock the rod and upper stem portion 22 rigidly at that adjustment.

Ports 78 and 80 are provided in bonnet 12, respectively, to allow entry of a suitable test fluid when the valve is inspected under a vacuum after assembly. Due to the positioning of the ports neither will impair the fluid tightness of the assembly when used in the field after testing. The use of ports 78 and 80 permits finer quality control and inspection of the finished article. That is, it is contemplated that the actuaing means and valve body may be assembled at one plant and tested there or in the alternative, the parts may be assembled elsewhere and the test can be conducted in the field. Usually the tests are conducted in the factory.

The packing 30 seals between the bonnet 12 and upper stem section 22 should a rupture occur in bellows 48. Therefore, the packing 30 will serve as a seal for emergency purposes to prevent leaks of corrosive or expensive fluid materials which may be passing through the valve body. The packing 30 is excellent assistance for the back seat of the shoulder 33 and the ridge 35. The packing 30 is not intended as a long stem seal but will serve to seal the valve bonnet until such time as the equipment can be appropriately shut down and repaired. The packing also serves the very useful function of guiding the first stem section 22. The particular construction of this overall combination of elements has very little guiding function throughout but the packing 30, located as it is in the upper portion of the bonnet 12 makes an excellent guide for the first stem section 22.

A need for the relatively frictionless connection between the two stem sections which includes ball 36, flange extension 38, pin 44 and groove 42 is necessary because it is extremely important that torque not be exerted on bellows 48. The means for securing the bellows 48 to flange 46 and ring 50 is not of great shear strength and the bellows, to serve its function must be flexible. Therefore, the necessity for preventing a torque being applied to the bellows is evident. Hence, the swivel connection of the two stem sections.

For ease of description the principles of the invention have been set forth in connection with but two illustrated embodiments. It is not intended that the illustrated embodiments nor the technology employed in describing them be limiting inasmuch as variations in these may be made by one having ordinary skill in the art without departing from the scope and spirit of the invention. Rather, it is intended that any restriction on the invention be limited to the spirit and scope of the appended claims.

The invention claimed is:

1. In combination, a bellows valve and an actuator for regulating the valve;
   means for rigidly connecting said actuator to said valve;
   said valve including a body, a bonnet and stem means;
   the body having a stem opening and passage means between an inlet and an outlet, a valve seat in said passage;
   said actuator including a housing and a rod projecting from said housing toward said bonnet, said rod being reciprocable with respect to said housing and bonnet;
   said rod being adjustably connected to a first section of said stem means;
   a second stem section axially aligned with and connected to said first stem section;
   the connecting means between the stem sections providing for relative rotation of said sections without simultaneous relative axial movement;
   the second stem section projecting through said stem opening into said passage;
   a seat on said second stem section disposed within said body for sealing against the valve seat in said passage; and
   a bellows disposed around said second stem section and attached in fluid tight relationship to said stem and to said body whereby the bellows acts as a seal for said stem opening.

2. The combination of claim 1 wherein the connection between the first stem section and the rod includes interengaging threads and the first stem section is adapted to be rotated relative to the rod for adjusting the length of the connected combination of the rod, the first stem section and the second stem section.

3. The combination of claim 2 wherein the threads of the threaded rod-stem connection are machine threads and said first stem section includes tool pads thereon disposed between the threads thereon and the bonnet.

4. The combination of claim 3 including packing disposed around the first stem section and within said bonnet, the packing serving to guide and seal around said stem intermediate said tool pads and the connection with the second stem section.

5. The combination of claim 1 wherein the actuating means includes a piston in a cylinder, said piston being reciprocable in said cylinder and being connected to said rod.

6. The combination of claim 5 wherein the position of the piston is controlled by a source of air pressure.

7. The combination of claim 2 wherein the actuating means includes a piston in a cylinder, said piston being reciprocable to said cylinder and being connected to said rod.

8. The combination of claim 3 wherein the actuating means includes a piston in a cylinder, said piston being reciprocable in said cylinder and being connected to said rod.

9. The combination of claim 4 wherein the actuating means includes a piston in a cylinder, said piston being reciprocable in said cylinder and being connected to said rod.

10. The combination of claim 9 wherein the position of the piston is controlled by a source of air pressure.

11. The combination of claim 8 wherein the position of the piston is controlled by a source of air pressure.

References Cited

UNITED STATES PATENTS

| | | | |
|---|---|---|---|
| 2,770,255 | 11/1956 | Goddard | 251—335.2 X |
| 2,399,301 | 4/1946 | Spence | 251—61.2 |
| 3,206,165 | 9/1965 | Salmon et al. | 251—214 X |
| 3,290,003 | 12/1966 | Kessler | 251—291 X |

FOREIGN PATENTS

| | | |
|---|---|---|
| 1,095,150 | 12/1954 | France. |

ARNOLD ROSENTHAL, Primary Examiner

U.S. Cl. X.L.

251—63.5